US006756149B2

(12) United States Patent
Knights et al.

(10) Patent No.: US 6,756,149 B2
(45) Date of Patent: Jun. 29, 2004

(54) ELECTROCHEMICAL FUEL CELL WITH NON-UNIFORM FLUID FLOW DESIGN

(75) Inventors: Shanna Denine Knights, Burnaby (CA); David Pentreath Wilkinson, North Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 180 days.

(21) Appl. No.: 10/004,528

(22) Filed: Oct. 23, 2001

(65) Prior Publication Data
US 2003/0077501 A1 Apr. 24, 2003

(51) Int. Cl.$^7$ ................................................ H01M 8/04
(52) U.S. Cl. ............................ 429/38; 429/34; 429/39
(58) Field of Search .............................. 429/34, 38, 39

(56) References Cited

U.S. PATENT DOCUMENTS

| | | | | |
|---|---|---|---|---|
| 4,808,493 A | | 2/1989 | Breault | 429/42 |
| 5,702,839 A | | 12/1997 | Frost et al. | 429/42 |
| 5,840,438 A | | 11/1998 | Johnson et al. | 429/30 |
| 5,976,726 A | | 11/1999 | Wilkinson et al. | 429/35 |
| 6,586,128 B1 | * | 7/2003 | Johnson et al. | 429/34 |
| 2002/0076600 A1 | * | 6/2002 | Keegan | 429/38 |
| 2003/0108782 A1 | * | 6/2003 | Leger et al. | 429/30 |

FOREIGN PATENT DOCUMENTS

| | | |
|---|---|---|
| DE | 100 54 444 A1 | 5/2001 |
| JP | 06267564 A * 9/1994 | H01M/8/02 |
| WO | WO 00/31813 | 6/2000 |

OTHER PUBLICATIONS

Abstract of JP 2001–043868, Patent Abstracts of Japan, Feb. 16, 2001.
Abstract of JP 2001–006717, Patent Abstracts of Japan, Jan. 12, 2001.
Abstract of JP 10–050327, Patent Abstracts of Japan, Feb. 20, 1998.
Translation of DE 100 54 444 A1, May 10, 2001.
Abstract of JP 02–040862, Patent Abstract of Japan, Feb. 9, 1990.

* cited by examiner

Primary Examiner—Carol Chaney
(74) Attorney, Agent, or Firm—Seed IP Law Group PLLC

(57) ABSTRACT

An electrochemical fuel cell having reactant flow passages with a non-uniform design to increase reactant access to an adjacent fluid distribution layer at the outlet region as compared to the inlet region. In an embodiment, at least one reactant flow passage is narrower at the inlet than at the outlet, with a substantially constant cross-sectional area maintained along its length. Coolant channels may optionally be incorporated in the fluid flow plate to provide increased cooling at the reactant inlet. The plates may vary in thickness and run in counter-flow to improve efficient stacking of the fuel cells in a fuel cell stack with reactant passages of varying depth. In another embodiment, electrically conductive, masking foil covers a portion of at least one reactant flow passage in the inlet region, but does not extend the length of the passage.

15 Claims, 7 Drawing Sheets

ELECTROCHEMICAL FUEL CELL WITH NON-UNIFORM FLUID FLOW DESIGN

BACKGROUND OF THE INVENTION

1. Field of the Invention

This invention relates generally to electrochemical fuel cells and, more specifically, to an electrochemical fuel cell wherein the fluid flow design provides greater reactant contact with the fluid distribution layer in the outlet region than in the inlet region.

2. Description of the Related Art

Electrochemical fuel cells convert reactants, namely, fuel and oxidant fluid streams, to generate electric power and reaction products. Solid polymer fuel cells typically employ a membrane electrode assembly (MEA) consisting of a solid polymer electrolyte or ion exchange membrane disposed between two electrode layers, namely a cathode and an anode. The membrane, in addition to being an ion conductive (typically proton conductive) material, also acts as a barrier for isolating the reactant streams from each other.

At the anode, the fuel stream moves through the porous anode substrate and is oxidized at the anode electrocatalyst layer. At the cathode, the oxidant stream moves through the porous cathode substrate and is reduced at the cathode electrocatalyst layer to form a reaction product. The location of the electrocatalyst generally defines the electrochemically active area.

In electrochemical fuel cells, the MEA is typically interposed between two substantially fluid impermeable separator plates (anode and cathode plates). The plates typically act as current collectors and provide support to the MEA. The plates may have reactant passages formed therein and act as flow field plates providing access of the fuel and oxidant to the porous anode and cathode surfaces, respectively, and providing for the removal of product water formed during operation of the cells.

The conditions in an operating fuel cell vary significantly across the electrochemically active area of each electrode. For example, as the oxidant is consumed, water is produced, the total gas pressure normally decreases and the oxidant partial pressure decreases. This results in a greater current density in a region near the reactant inlet as compared to the reactant outlet. Performance of the cell may be limited by the high current density region, thereby resulting in a lower overall voltage than if the current density were uniformly distributed across the cell. High current density also results in increased local temperatures which tend to lead to greater material degradation. Higher temperatures may also result in a decrease in the relative humidity at the inlet, which can increase the likelihood of transfer leaks developing across the membrane and cause a localized loss of performance. This latter effect can be exacerbated if there is little or no humidification of the inlet gas streams. While the inlet portion of the cell is likely to be too dry, the outlet portion of the cell is likely to have too much water which can result in localized flooding, uneven performance and increased mass transport losses. Thus, the requirements and desired properties of the fuel cell electrode and flow field plate will vary across the fuel cell.

U.S. Pat. No. 5,840,438 which is incorporated herein by reference, discloses the fuel cell performance benefits of imparting different fluid transport properties in a fuel cell electrode substrate, in a biased manner, between a reactant inlet and outlet. U.S. Pat. Nos. 4,808,493 and 5,702,839 disclose varying the loading or composition of the electrocatalyst or other components, in a fuel cell electrode layer in a biased manner between a reactant inlet and outlet.

PCT Publication No. WO 00/31813 discloses an additional perforated plate interposed between a separator plate and an adjacent porous fluid distribution layer wherein the perforations in the plate vary in size. Japanese Publication No. 2001-043868 discloses increasing the cross-sectional area of the flow field path in the separator plates between the reactant inlet and outlet. Conversely, Japanese Publication No. 2001-006717 discloses decreasing the cross-sectional area of the flow field path in the separator plates between the reactant inlet and outlet. U.S. Pat. No. 6,048,633 discloses decreasing the effective cross-sectional area of reactant passages through the progressive convergence of flow field paths.

While a number of advantages have been made in this field, there remains a need for improved electrochemical fuel cells, particularly with regard to field flow distribution. The present invention fulfills this need and provides further related advantages.

BRIEF SUMMARY OF THE INVENTION

In a typical fuel cell, reactants, either an oxidant or a fuel, flow from the inlet to the outlet through a plurality of reactant flow passages. The reactants diffuse from the reactant flow passages through a fluid distribution layer to a catalyst layer where the electrochemical reaction takes place. In typical fuel cells, the reactant flow passages are uniform in depth and width along their length. To improve the operating conditions of the cell, the reactant flow passages may be non-uniform in design. In particular the design can advantageously allow greater reactant access to the fluid distribution layer as the reactant flows from the inlet to the outlet.

In one embodiment, at least one reactant flow passage is narrower at the inlet than at the outlet. In order to maintain a substantially constant gas velocity, the reactant flow passage may become shallower as the passage widens to maintain a substantially constant cross-sectional area along the length of the passage. For example, the reactant flow passage may increase in width continuously from the inlet to the outlet. In another embodiment, the reactant flow passage may increase in width from the inlet to a point between the inlet and the outlet and thereafter maintain a substantially constant width to the outlet. Alternatively, the reactant flow passage can increase in width in a step-wise manner. In yet another embodiment, a reactant flow passage furcates to two or more shallower passages while maintaining a substantially constant total cross-sectional area.

The above embodiments can be used in a fuel cell comprising a fluid distribution layer comprising a porous, fluid permeable sheet material wherein the reactant flow passages comprise reactant flow passages on a surface of the separator plate facing the adjacent fluid distribution layer. Alternately, the fluid distribution layer may comprise a substantially fluid impermeable sheet material perforated in the active area. If a perforated, substantially fluid impermeable sheet material is used for the fluid distribution layer, the reactant flow passages may be formed in either a major surface of the separator plate facing the adjacent fluid distribution layer or in a major planar surface of the fluid distribution layer facing the adjacent separator plate.

Additional features may be present, such as, for example, coolant flow channels that mirror the reactant flow passages by being wider and deeper at the reactant inlet than at the reactant outlet or water transport features such as, for example, capillary channels or wicking fibres.

To accommodate the extra depth of the reactant flow passages at the inlet, the thickness of the plate may vary from the inlet to the outlet, and in particular, the plate may be thicker at the inlet than at the outlet. This may result in a substantially rectangular, wedge-shaped plate. In a fuel cell with two such plates, the inlet of the anode can be aligned with the outlet of the cathode.

In an alternate embodiment, a fuel cell comprises a conductive, substantially fluid impermeable masking foil superposed over at least one reactant flow passage in a region near the inlet and not extending the length of the fuel cell to the outlet.

These and other aspects of this invention will be evident upon review of the attached figures and following detailed description.

DETAILED DESCRIPTION OF THE INVENTION

Figure 1:
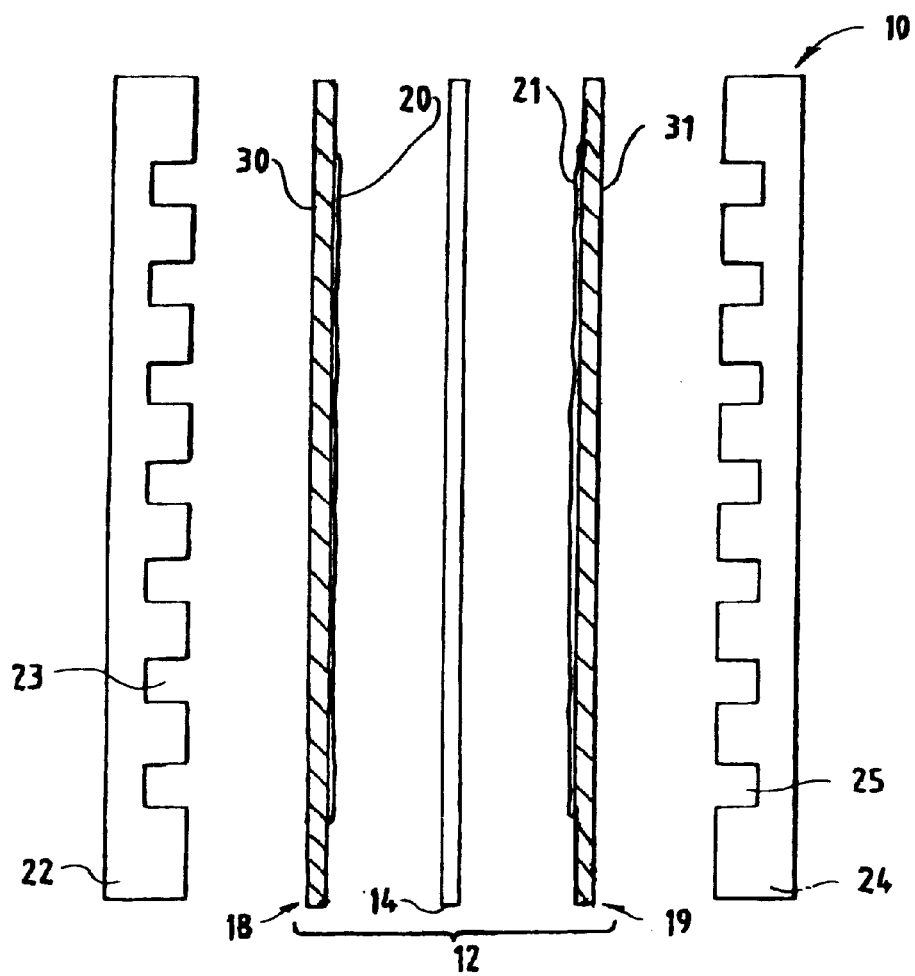
FIG. 1 is an exploded sectional view of a prior art electrochemical fuel cell showing an MEA interposed between two flow field plates.

As mentioned above, an electrochemical fuel cell is disclosed having a fluid flow that provides greater reactant contact with the fluid distribution layer in the outlet region than the inlet region. FIG. 1 illustrates a conventional fuel cell 10. Fuel cell 10 includes a membrane electrode assembly 12 interposed between anode separator plate 22 and cathode separator plate 24. Membrane electrode assembly 12 consists of an ion exchange membrane 14 interposed between two electrodes, namely, anode 18 and cathode 19. In conventional fuel cells, anode 18 and cathode 19 comprise a fluid distribution layer of porous electrically conductive sheet material 30 and 31, respectively. Sheet material 30, 31 is typically composed of materials such as, for example, carbon fiber paper, woven or non-woven carbon fabric, or metal mesh or gauze. Each fluid distribution layer has a thin layer of electrocatalyst 20 and 21, such as platinum black or a carbon-supported platinum catalyst, disposed on one of the major surfaces at the interface with membrane 14 to render each electrode electrochemically active. Membrane electrode assembly 12 is interposed between anode separator plate 22 and cathode separator plate 24. Anode separator plate 22 has at least one fuel passage 23 formed in its surface facing anode fluid distribution layer 30. Cathode flow field plate 24 has at least one oxidant flow passage 25 formed in its surface facing cathode fluid distribution layer 31. When assembled against the cooperating surfaces of fluid distribution layers 30 and 31, passages 23 and 25 form reactant flow passages for the fuel and oxidant, respectively. Fuel cells of the type described in FIG. 1 will herein be referred to as type I fuel cells.

Instead of being formed of a porous electrically conductive sheet material, the fluid distribution layer may be composed of a substantially fluid impermeable sheet material which is rendered fluid permeable at least in the active region by, for example, perforating the sheet material. Perforating the sheet material, at least in the active region, permits the passage of reactant fluid between the two major planar surfaces thereof and to the electrocatalyst layer. U.S. Pat. No. 5,976,726, which is hereby incorporated by reference, discloses the use of such a substantially fluid impermeable sheet material.

Figure 2:
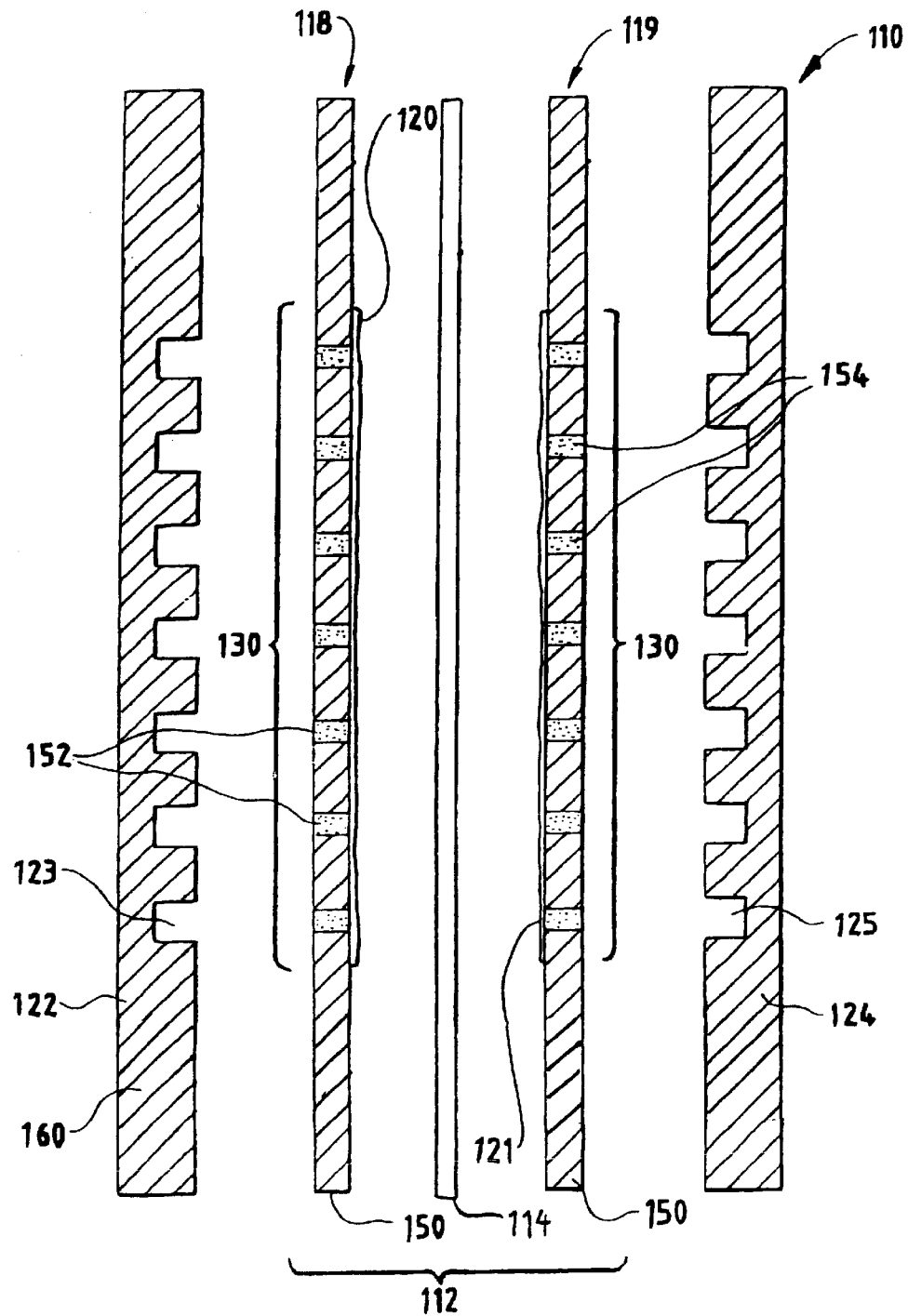
FIG. 2 is an exploded sectional view of a prior art electrochemical fuel cell which includes a pair of fluid flow field plates and a pair of fluid distribution layers, wherein the fluid distribution layers include a substantially fluid impermeable sheet material having a plurality of perforations formed in the electrochemically active region thereof.

FIG. 2 is an exploded sectional view of a fuel cell 110 having such a fluid distribution layer comprising a perforated substantially fluid impermeable material. Fuel cell 110 includes a membrane electrode assembly 112, including an ion exchange membrane 114 interposed between an anode fluid distribution layer and a cathode fluid distribution layer 118 and 119 respectively, with a quantity of electrocatalyst disposed in a layer 120, 121 at the interface between each fluid distribution layer 118 and 119 and membrane 114 in the electrochemically active region 130 of the fluid distribution layers 118 and 119. The membrane electrode assembly 112 is interposed between an anode separator plate 122 and a cathode separator plate 124, each plate having an open-faced passage 123, 125 formed in its surface facing the corresponding fluid distribution layer 118, 119. The fluid distribution layers 118, 119 comprise a substantially fluid impermeable sheet material 150 that is perforated at least in the electrochemically active region. Perforations 152 render the respective fluid distribution layer fluid permeable at least in the through-plane direction. The perforations 152 may contain a filler material 154 which is preferably electrically conductive. For example, the filler material 154 may comprise particulate carbon or hydrophilic or hydrophobic materials, which do not completely block the perforations to passage of reactant. The membrane electrode assembly 112 optionally contains gaskets (not shown) to form a seal circumscribing the electrochemically active region of each fluid distribution layer 118, 119. Fuel cells of the type described in FIG. 2 will herein be referred to as type II fuel cells.

Figure 3:
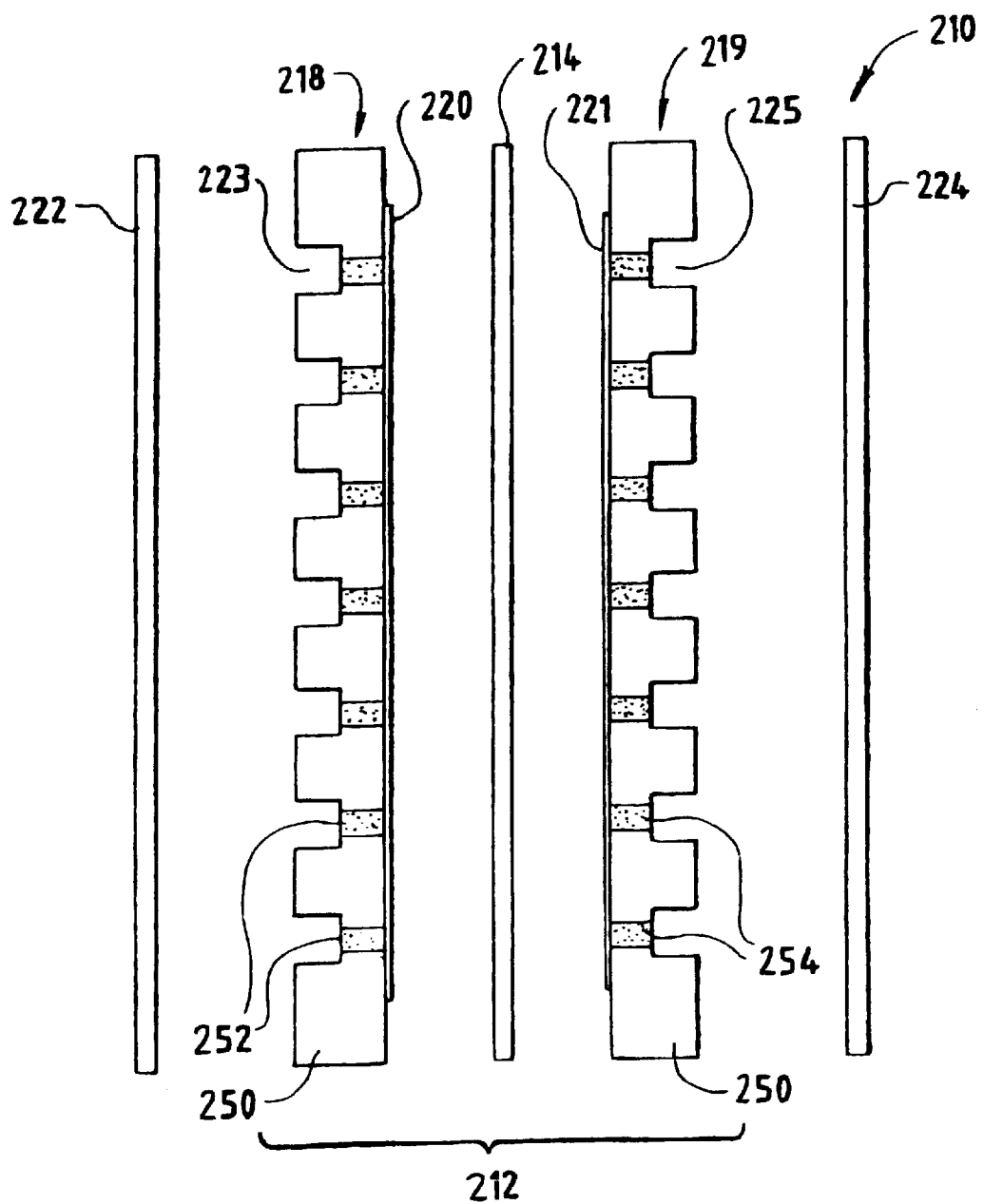
FIG. 3 is an exploded sectional view of a prior art electrochemical fuel cell which includes a pair of separator plates and a pair of fluid distribution layers, wherein the fluid distribution layers include a substantially fluid impermeable sheet material having plurality of perforations in the electrochemically active region thereof, and fluid flow passages formed in a major surface thereof.

FIG. 3 is an exploded sectional view of a fuel cell 210 having a fluid distribution layer having a perforated substantially fluid impermeable material and further comprising integrated fluid flow passages. Fuel cell 210 includes a membrane electrode assembly 212, including an ion exchange membrane 214 interposed between an anode fluid distribution layer and a cathode fluid distribution layer 218 and 219 respectively, with a quantity of electrocatalyst disposed in a layer 220, 221 at the interface between each fluid distribution layer 218 and 219 and membrane 214. The membrane electrode assembly 212 is interposed between an anode separator plate 222 and a cathode separator plate 224. Each fluid distribution layer comprises open-faced passages 223, 225 formed in its surface facing the corresponding separator plate 222, 224. Fluid distribution layers 218, 219 comprise a perforated substantially fluid impermeable sheet material 250. Perforations 252 render the respective fluid distribution layer fluid permeable at least in the through plane direction. Perforations 252 may contain a filler material 254 which is preferably electrically conductive. The membrane electrode assembly 212 optionally contains gaskets (not shown) to form a seal circumscribing the electrochemically active region of each fluid distribution layer 218, 219. Fuel cells of the type described by FIG. 3 will herein be referred to as type III fuel cells.

The substantially fluid impermeable sheet material 150 in FIG. 2 and 250 in FIG. 3 is preferably formed from an electrically conductive material such as flexible graphite, carbon resin or a metal and may further comprise an electrically conductive filler within perforations in the perforated active region. Preferably, flexible graphite is used. Flexible graphite is also known as graphite foil, exfoliated graphite and expanded graphite.

In each of fuel cells 10, 110 and 210 as illustrated in FIGS. 1,2 and 3 respectively, reactant flow passages are formed by the cooperative interaction of the separator plates and the fluid distribution layer. A significant difference is that reactant flow passages 23, 25, 123 and 125 in FIGS. 1 and 2 are in the separator plates whereas in FIG. 3, the reactant flow passages 223 and 225 are in fluid distribution layer.

Figure 4A:
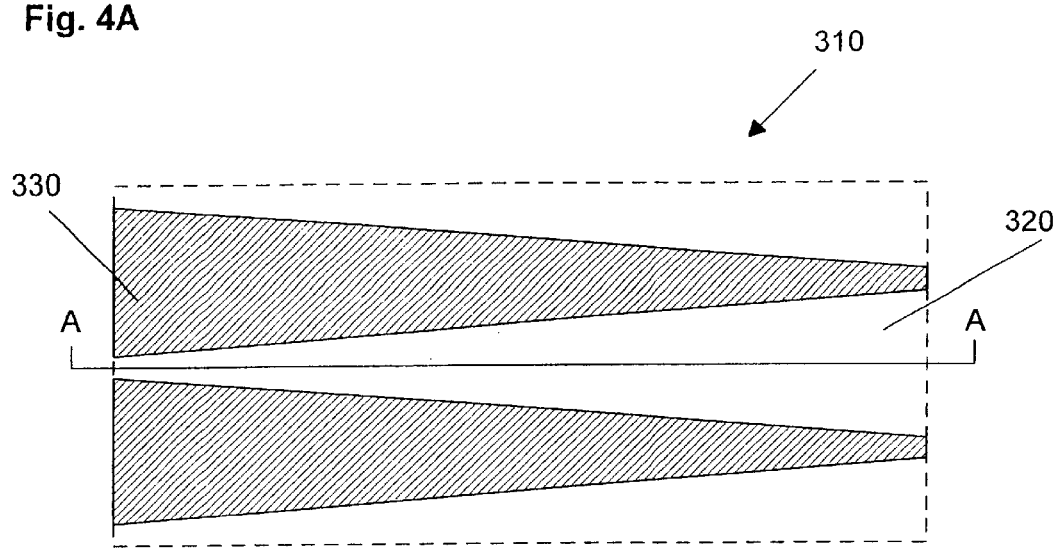
FIG. 4A is a plan view of a portion of a flow field plate showing an exaggerated increase in width of the reactant passages from the inlet to the outlet.
Figure 4B:
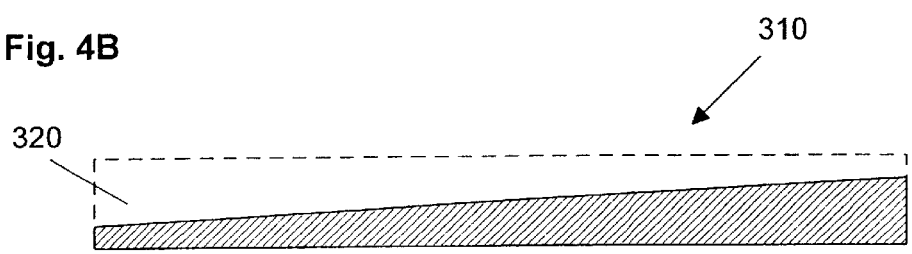
FIG. 4B is a sectional view along the axis A in FIG. 4A.

FIG. 4A is a plan view of a flow field plate 310 comprising reactant flow passages 320 that increase in width as a reactant flows from the inlet to the outlet. The extent to which the reactant flow passages 320 in FIG. 4A increase in width is exaggerated for illustrative purposes. The reactant flow passages may increase in width continuously to the outlet as illustrated in FIG. 4A or the passages may increase in width in a different configuration such as, for example, tapered near the inlet only, increasing in width to a mid-point and then of constant width to the outlet or the passage may increase in a step-wise fashion. As the reactant concentration is reduced and the water content increases, the landing area 330 decreases and the width of the open-faced passage increases to provide greater reactant access to the catalyst layer and better water removal. The depth of the reactant flow passage 320 can be decreased as the passages widen to substantially maintain the cross-sectional area of reactant flow passage 320 and thereby substantially maintain gas velocity and water removal capacity. FIG. 4B is a sectional view of flow field plate 310 along axis A as shown in FIG. 4A. The numerals in FIG. 4B refer to the same structures as in FIG. 4A.

Figure 5A:
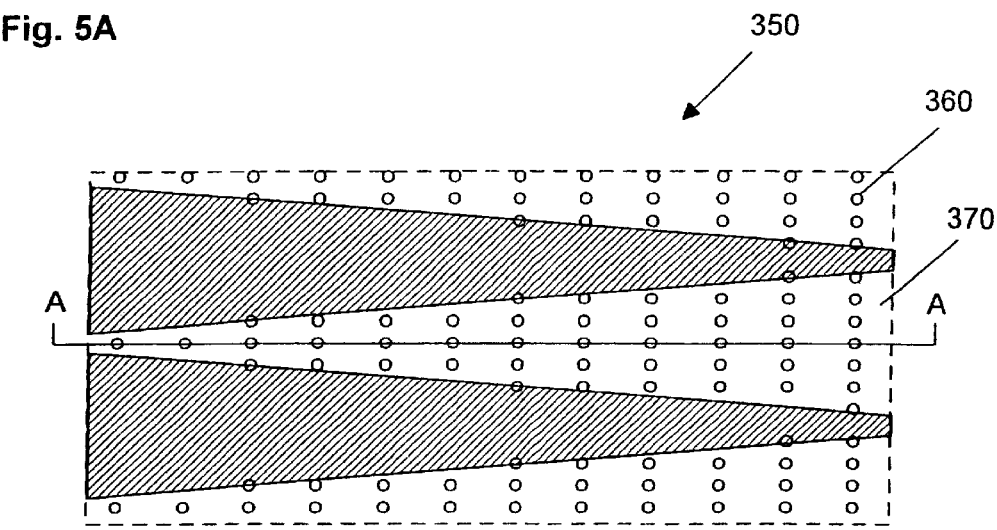
FIG. 5A is a plan view of a portion of a fluid distribution layer as in FIG. 3 showing an exaggerated increase in width of the reactant passages from the inlet to the outlet.
Figure 5B:
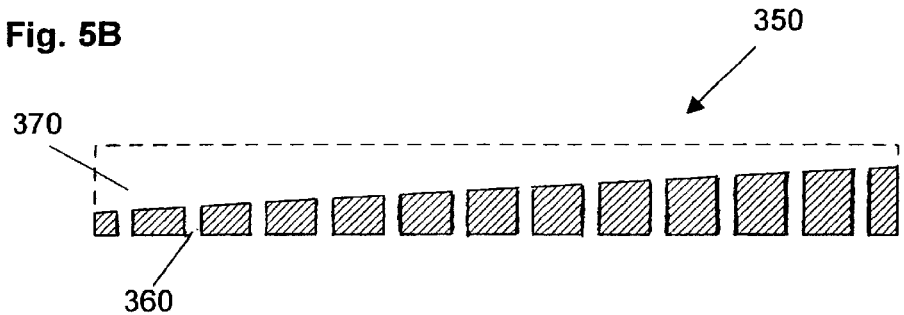
FIG. 5B is a sectional view along the axis A in FIG. 5A.

FIG. 5A is a plan view of fluid distribution layer 350 of a type III fuel cell, namely comprising a substantially fluid impermeable sheet material, perforations 360 and reactant flow passages 365. As in FIG. 4A, the extent to which the reactant flow passage increases in width is exaggerated for illustrative purposes. While perforations 360 are shown as being of uniform size, shape and density across fluid distribution layer 350, it is understood that the size, shape or density of the perforations may also vary. FIG. 5B is a sectional view of fluid distribution layer 350 along axis A as shown in FIG. 5A. The numerals in FIG. 5B refer to the same structures as in FIG. 5A.

Figure 6A:
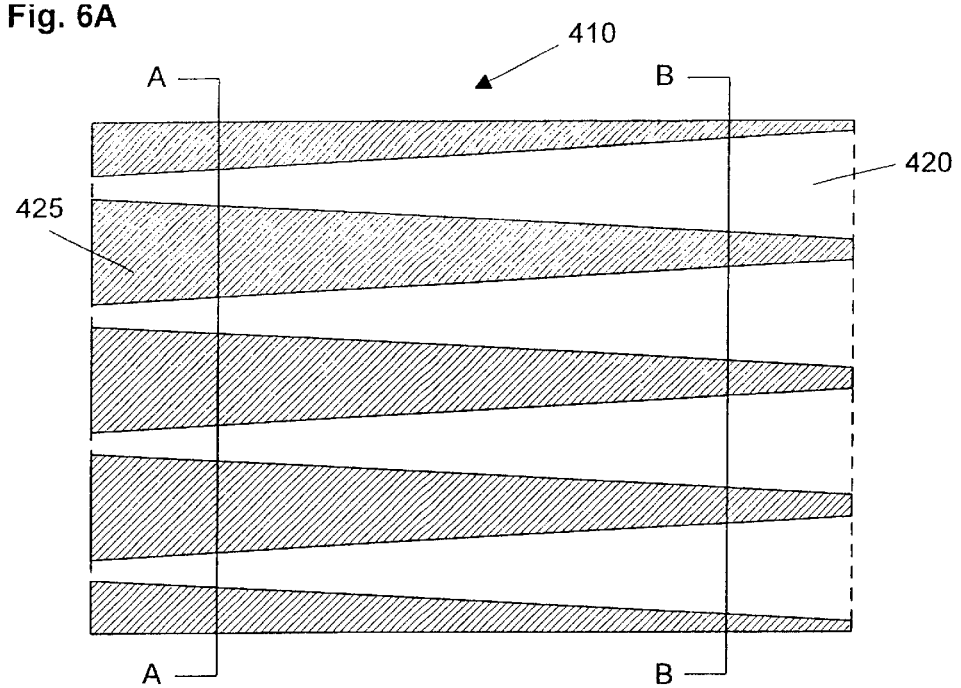
FIG. 6A is a plan view of a flow field plate incorporating non-uniform coolant channels (not shown) in the opposite surface to the reactant flow passages.
Figure 6B:
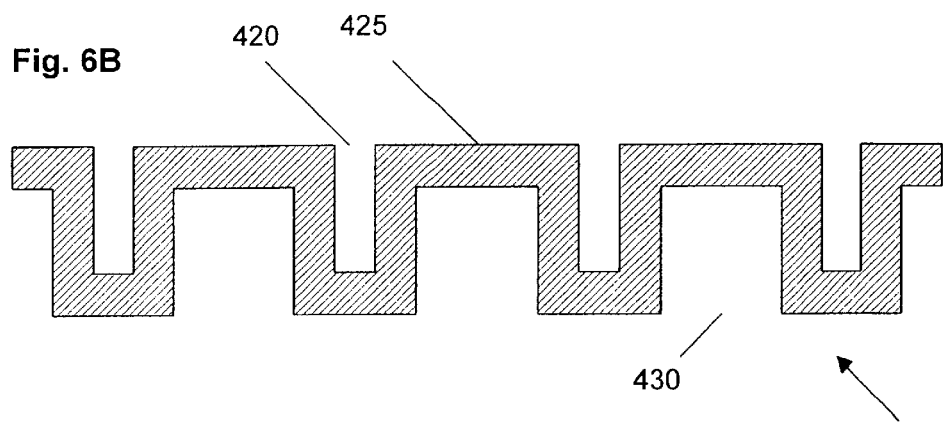
FIG. 6B is a sectional view along axis A in FIG. 6A, near the inlet of the flow field plate
Figure 6C:
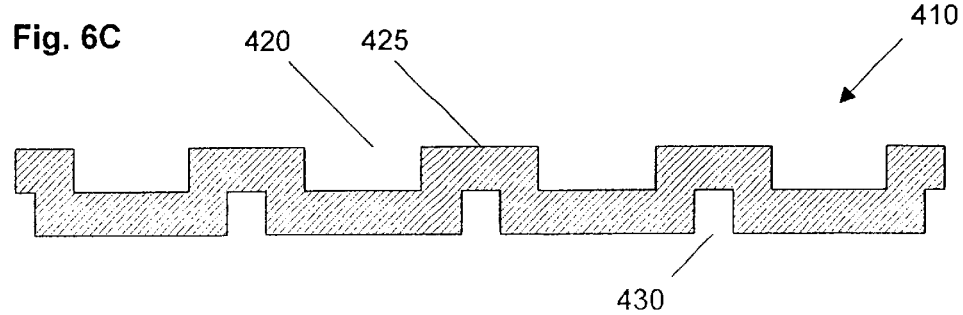
FIG. 6C is a sectional view along axis B, near the outlet of the flow field plate.

Coolant channels that "mirror" the reactant flow passages may also be incorporated directly into the flow field plate in type I or type II fuel cells. FIG. 6A is a plan view of flow field plate 410 comprising coolant flow channels on the opposite surface to that shown. FIG. 6B is a sectional view of flow field plate 410 near the inlet along axis A and FIG. 5B is a sectional view of flow field plate 410 near the outlet along axis B. Reactant flow passage 420 is deep and narrow at the inlet region and shallow and wide in the outlet region. On the opposite surface of flow field plate 410, coolant channels 430 may run deep and wide in the inlet region and shallow and narrow in the outlet region. This design is beneficial for water transport as coolant channels 430 provide for increased cooling at the inlet region and decreased cooling at the outlet region while maintaining a reduced overall size for the fuel cell.

In another embodiment, at least one reactant flow passage furcates into two or more passages and thereby increases the overall width and contact area of the reactant with the fluid distribution layer. As in the embodiment illustrated in FIG. 4, the depth of the furcated passages can be reduced relative to the original inlet passage so as to maintain gas velocity and water removal.

These embodiments are amenable to techniques for directing the accumulated water away from the outlet region to the dryer, inlet region such as, for example, using capillary channels or wicking fibres incorporated in the cathode.

Figure 7:
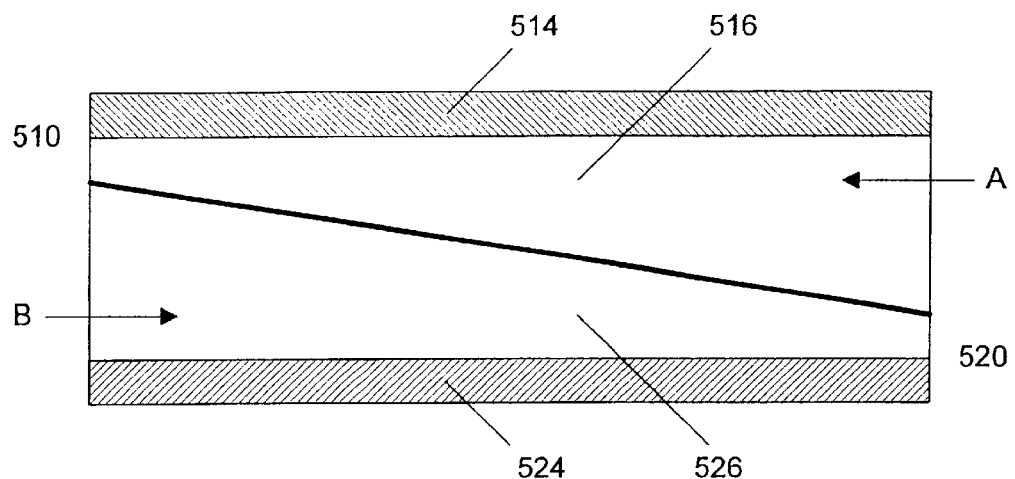
FIG. 7 is a sectional view showing the interface between two electrochemical fuel cell electrodes of varying thickness stacked together from the ion exchange membrane of the first electrode to the ion exchange membrane of the second electrode.

To more easily accommodate the thicker plate required for the inlet region of the fuel cell, flow field plates incorporating reactant passages may vary in thickness across their area, for example, with the plates being thicker near the inlet. The fuel and oxidant may then may be directed in a counter-flow configuration for improved stacking of the plates in a fuel cell stack. FIG. 7 is a sectional view of the interface of two fuel cells from ion exchange membrane 514 of fuel cell 510 to ion exchange membrane 524 of fuel cell 520. Arrow A shows the general oxidant flow direction from the oxidant inlet through cathode plate 516 to the oxidant outlet. Arrow B shows the general fuel flow direction from the fuel inlet through anode plate 526 to the fuel outlet. Improved stacking is most pronounced when adjacent plates are substantially rectangular and wedge-shaped as depicted in FIG. 7. Improved stacking occurs due to the thicker inlet region of cathode plate 516 of fuel cell 510 being aligned with the thinner outlet region of anode plate 526 of fuel cell 520. Conversely, the thicker inlet region of anode plate 526 is aligned with the thinner outlet region of cathode plate 516.

Figure 8:
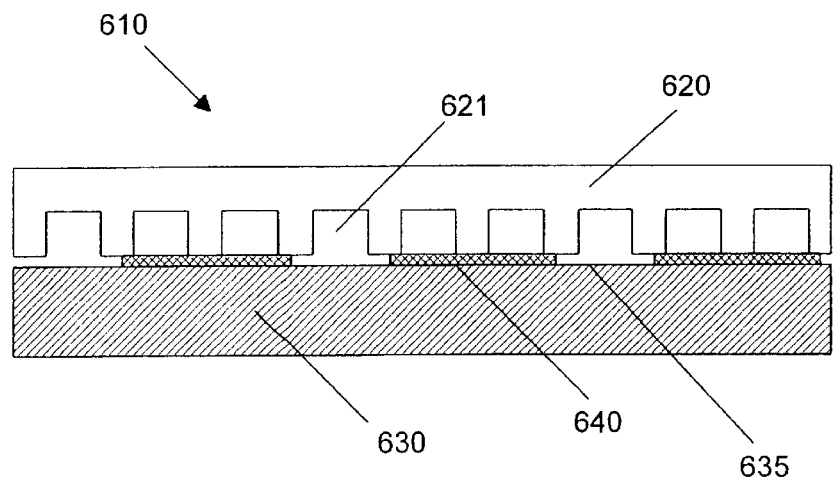
FIG. 8 is a sectional view of an electrochemical fuel cell showing the interface between a fluid flow field plate and a fluid distribution layer with a conductive, substantially fluid impermeable masking foil covering a plurality of the fluid flow passages.

FIG. 8 is a sectional view of a fuel cell 610 near the reactant inlet showing the interface between a fluid distribution layer 630 and flow field plate 620. In an embodiment of the present fuel cell, conductive, substantially fluid impermeable masking foil 640 covers some, though not all of reactant flow passages 621 in a region near the reactant inlet of fuel cell 610. Masking foil 640 does not extend along the entire length of passages 621. As a reactant (not shown) flows from the inlet to the outlet, reactant access to the fluid distribution layer is limited in the inlet region to those passage portions not covered by masking foil 640. In the outlet region, masking foil 640 does not cover the reactant passages and therefore reactant access to the fluid distribution layer is not similarly limited. Contact area 635 therefore increases as the reactant flows from the inlet to the outlet. Greater reactant access and increased water transport may therefore occur in the outlet region of the cell. Additional advantages of this embodiment include ease of manufacture for the improved flow field design, maintenance of a substantially constant thickness of the fuel cell components for ease of stacking, and ease of maintaining reactant flow rates. This approach can be used in fuel cells of type I or type II.

In the above embodiments, the improved flow field design can be used on the cathode side, the anode side or both. This allows for better control of operating conditions and current density across the cell. Further the inlet may be protected from the drying effect of the inlet reactant stream by reducing the contact area. Conversely, there may be greater contact with the reactant stream and greater water transport in the outlet portion of the cell where accumulating water may otherwise cause localized flooding and restrict access of the reactant to the catalyst. The end result is a fuel cell with greater reliability and durability.

While particular steps, elements, embodiments and applications of the present invention have been shown and described, it will be understood, of course, that the invention is not limited thereto since modifications may be made by persons skilled in the art, particularly in light of the foregoing teachings. It is therefore contemplated by the appended claims to cover such modifications as incorporate those steps or elements which come within the spirit and scope of the invention.

What is claimed is:

1. An electrochemical fuel cell comprising:
   (a) a pair of substantially fluid impermeable flow field plates each comprising an inlet, an outlet, a first major surface and a second major surface, the first surface of each flow field plate comprising a plurality of reactant flow passages for directing a reactant stream from the inlet to the outlet;
   (b) a pair of fluid distribution layers interposed between the first surfaces of the flow field plates;
   (c) an ion exchange membrane interposed between at least a portion of the fluid distribution layers; and
   (d) electrocatalyst interposed between at least a portion of each of the fluid distribution layers and at least a portion of the membrane, thereby defining the active region; wherein at least one reactant flow passage is narrower at the inlet than at the outlet, and the cross-sectional area of the at least one reactant flow passage is substantially constant from the inlet to the outlet.

2. The electrochemical fuel cell of claim 1 wherein the fluid distribution layers comprise a porous, fluid permeable sheet material.

3. The electrochemical fuel cell of claim 1 wherein the fluid distribution layers comprise a substantially fluid impermeable sheet material perforated at least in the active area.

4. The electrochemical fuel cell of claim 1 wherein the at least one reactant flow passage continuously increases in width from the inlet to the outlet.

5. The electrochemical fuel cell of claim 1 wherein the at least one reactant flow passage increases in width from the inlet to a point between the inlet and the outlet and thereafter is of substantially constant width to the outlet.

6. The electrochemical fuel cell of claim 1 wherein the at least one reactant flow passage furcates, the combined width of the furcated passages being wider at the outlet than the width of the at least one passage at the inlet.

7. The electrochemical fuel cell of claim 1 wherein at least one flow field plate further comprises a plurality of coolant flow channels, a coolant inlet and a coolant outlet wherein the coolant flow channels are wider and deeper at the coolant inlet than at the coolant outlet.

8. The electrochemical fuel cell of claim 7 wherein the coolant flow channels are formed on the second surface of the at least one flow field plate.

9. The electrochemical fuel cell of claim 1 further comprising:
   (e) at least one water transport feature on a surface of at least one flow field plate facing the adjacent fluid distribution layer oriented substantially parallel to the reactant flow passages.

10. The electrochemical fuel cell of claim 9 wherein the water transport feature comprises capillary channels.

11. The electrochemical fuel cell of claim 9 wherein the water transport feature comprises wicking fibres.

12. An electrochemical fuel cell comprising:
   (a) a pair of substantially fluid impermeable separator plates;
   (b) a pair of fluid distribution layers interposed between the separator plates wherein the fluid distribution layers comprise a substantially fluid impermeable sheet material perforated at least in the active area, each fluid distribution layer further comprising an inlet, an outlet, and a plurality of reactant flow passages for directing a reactant stream from the inlet to the outlet;
   (c) an ion exchange membrane interposed between at least a portion of the fluid distribution layers; and
   (d) electrocatalyst interposed between at least a portion of each of the fluid distribution layers and at least a portion of the membrane, thereby defining the active region; wherein at least one reactant flow passage is narrower at the inlet than at the outlet, and the cross-sectional area of the at least one reactant flow passage is substantially constant from the inlet to the outlet.

13. The electrochemical fuel cell of claim 12 wherein the at least one reactant flow passage continuously increases in width from the inlet to the outlet.

14. The electrochemical fuel cell of claim 12 wherein the at least one reactant flow passage increases in width from the inlet to a point between the inlet and the outlet and thereafter is of substantially constant width to the outlet.

15. The electrochemical fuel cell of claim 12 wherein the at least one reactant flow passage furcates, the combined width of the furcated passages is wider at the outlet than the width of the at least one passage at the inlet.

* * * * *